(12) United States Patent
Lee et al.

(10) Patent No.: US 7,312,839 B2
(45) Date of Patent: Dec. 25, 2007

(54) LIGHT GUIDING PLATE, LIQUID CRYSTAL DISPLAY DEVICE USING THE SAME, AND METHOD FOR DISPLAYING PICTURES THEREOF

(75) Inventors: Ik-Soo Lee, Suwon-si (KR); Jin-Baek Kim, Gunpo-si (KR)

(73) Assignee: Samsung Electronics Co., Ltd. (KR)

( * ) Notice: Subject to any disclaimer, the term of this patent is extended or adjusted under 35 U.S.C. 154(b) by 92 days.

(21) Appl. No.: 10/763,758

(22) Filed: Jan. 22, 2004

(65) Prior Publication Data
US 2004/0218114 A1 Nov. 4, 2004

Related U.S. Application Data

(63) Continuation-in-part of application No. 10/244,492, filed on Sep. 16, 2002, now abandoned.

(30) Foreign Application Priority Data
Nov. 13, 2001 (KR) .............................. 2001-70566

(51) Int. Cl.
*G02F 1/1335* (2006.01)
(52) U.S. Cl. ..................... 349/63; 349/65; 362/331; 362/615
(58) Field of Classification Search ............ 349/62, 349/63, 65, 57, 61, 187, 95; 362/615, 619, 362/620, 331, 336, 337
See application file for complete search history.

(56) References Cited

U.S. PATENT DOCUMENTS 6,074,069 A * 6/2000 Chao-Ching et al. ......... 362/26
6,168,281 B1 * 1/2001 Suzuki ..................... 362/619
6,323,919 B1 * 11/2001 Yang et al. ................. 349/63
6,636,283 B2 * 10/2003 Sasagawa et al. ........... 349/65
6,685,343 B2 * 2/2004 Mabuchi .................... 362/331
2001/0019379 A1 * 9/2001 Ishihara et al. ............. 349/65

FOREIGN PATENT DOCUMENTS

| JP | 11-260128 | 9/1999 |
| JP | 2000-019330 | 1/2000 |
| JP | 2000-111900 | 4/2000 |
| JP | 2001-093315 | 4/2001 |

OTHER PUBLICATIONS

Japanese Office Action dated Jul. 6, 2005, for Application No. 2002-85805.

* cited by examiner

*Primary Examiner*—Thoi V. Duong
(74) *Attorney, Agent, or Firm*—Cantor Colburn LLP

(57) ABSTRACT

A light guiding plate includes a light incident portion into which light is incident from a light source, a light reflecting pattern to reflect the light provided from the light incident portion, and a light transmitting surface to transmit the light reflected by the light reflecting pattern to a display panel. The light reflecting pattern includes light reflecting sections each of which has a first light reflecting plane that is inclined with respect to the light transmitting surface to face toward the light source, and a second light reflecting plane that is inclined with respect to the light transmitting surface and connected with an edge of the first light reflecting plane so that the light reflection sections each form a prism shape. The light reflecting sections respectively having the second light reflecting planes that are configured to have different areal sizes to control reflectivity of the respective light reflecting sections.

8 Claims, 15 Drawing Sheets

LIGHT GUIDING PLATE, LIQUID CRYSTAL DISPLAY DEVICE USING THE SAME, AND METHOD FOR DISPLAYING PICTURES THEREOF

CROSS REFERENCE TO RELATED APPLICATIONS

This application is a continuation-in-part of application Ser. No. 10/244,492, filed Sep. 16, 2002, now abandoned, the disclosure of which is hereby incorporated herein by reference in its entirety.

BACKGROUND OF THE INVENTION

1. Field of the Invention

The present invention relates to a liquid crystal display device, and more particularly to a light guiding plate, a liquid crystal display device using the same, and a method for displaying an image using the same, in which the display function is remarkably improved by optimizing brightness balance in an effective display area.

2. Description of the Related Art

A liquid crystal display device is one of flat display devices, which precisely controls a light transmission of a liquid crystal so as to allow a user to recognize information processed in an information processing unit.

The liquid crystal display devices are generally classified into a transmission type liquid crystal display device and a reflection type liquid crystal display device. The reflection type liquid crystal display device is mainly used for a small-size or a middle-size display device and the transmission type liquid crystal display device is mainly used for a middle-sized or a large-sized display device.

Since the reflection type liquid crystal display device displays an image by using an external light source, it has a simple structure.

In addition, the reflection type liquid crystal display device has a low power consumption when displaying an image because it can display an image with a little power required for controlling a liquid crystal.

However, the reflection type liquid crystal display device does not precisely display an image at night or when the quantity of light required for displaying information is insufficient.

Such problems can be solved with the transmission type liquid crystal display device. Different from the reflection type liquid crystal display device, the transmission type liquid crystal display device generates a light by consuming an electric energy. The transmission type liquid crystal display device displays an image by using the light. As a result, the transmission type liquid crystal display device can freely display an image in any place regardless of an environmental condition.

However, the transmission type liquid crystal display device needs an additional power to generate the light for displaying an image besides the power for controlling the liquid crystal, so the power consumption thereof increases when compared with that of the reflection type liquid crystal display device.

In addition, the transmission type liquid crystal display device requires a plurality of members for obtaining a uniform optical distribution of the light generated for displaying an image. For this reason, the transmission type liquid crystal display device has a complicated structure, which complicates manufacturing process, and increases manufacturing time and cost.

A front illumination type liquid crystal display device solves the problems of the transmission and reflection type liquid crystal display devices and maintains advantages thereof.

The front illumination type liquid crystal display device displays information by using an external light when the external light is sufficient. On the other hand, when the external light is insufficient, the front illumination type liquid crystal display device displays an image by using an artificial light, which is generated by consuming an electric energy. As a result, the front illumination type liquid crystal display device can display an image in any place with a reduced power consumption compared with the transmission type liquid crystal display device.

In addition, the front illumination type liquid crystal display device only requires a light guiding plate for uniformly distributing the artificial light, so the structure thereof is very simple.

FIG. 1 shows a conventional front illumination type liquid crystal display device 10 (hereinafter, simply referred to as "liquid crystal display device").

Referring to FIG. 1, the conventional liquid crystal display device 10 has a front light assembly 3 including a light source 1 and a light guiding plate 2, and a liquid crystal display panel assembly 9.

The liquid crystal display panel assembly 9 has a liquid crystal display panel 7 including a TFT substrate 5 having a pixel electrode, a TFT, and a signal line, a liquid crystal 6, and a color filter substrate 4 having a common electrode opposite the pixel electrode and R.G.B. color pixels, and a driving module 8 for driving the liquid crystal display panel 7.

The liquid crystal display panel assembly 9 precisely controls the alignment of the liquid crystal by a microscopic area unit. However, in a place where the light is insufficient or does not exist, the liquid crystal display device 10 does not display information even where the liquid crystal of the liquid crystal display panel assembly 9 is precisely controlled, because the liquid crystal 6 itself does not generate the light required for displaying an image.

Therefore, as shown in FIG. 1, the front light assembly 3 including the light source 1 and the light guiding plate 2 is required for displaying an image in the liquid crystal display device 10.

Preferably, the light source 1 for supplying the light to the liquid crystal display panel assembly 9 does not show a brightness variation within a predetermined area, just like sunlight. However, it is very difficult to manufacture the light source 1 having the brightness distribution similar to that of the sunlight. Thus, a linear light source or a point light source which has a high brightness and can be easily manufactured is used as the light source 1.

However, the linear light source and the point light source show a remarkable brightness variation depending on a distance between the light source and a light incident portion. Therefore, if the light generated from the linear light source or the point light source is directly supplied to the liquid crystal display panel assembly 9, display failure, such as a division of a screen or a spot on the screen, can be generated due to the remarkable brightness variation.

For this reason, as shown in FIG. 1 or 2, the light guiding plate 2 is used for obtaining a surface light source effect similar to the sunlight, from the light generated by the linear light source or the point light source.

The light guiding plate 2 has a hexagonal plate shape with a thin thickness, which corresponds to the shape of an effective display area of the liquid crystal display device 10.

The light guiding plate 2 varies the optical distribution of the light. In detail, the light guiding plate 2 allows the light concentrated in a small area to be uniformly distributed in a large area. In addition, the light guiding plate 2 varies the direction of the light having the varied optical distribution to be directed into the liquid crystal display panel assembly 9.

Where the light is leaked from the light guiding plate 2, which transfers the light generated from the light source 1 to the liquid crystal display panel assembly 9 by processing the light, the quantity of the light supplied to the liquid crystal display panel assembly 9 is reduced, so the optical efficiency can be lowered. In order to prevent the deterioration of the optical efficiency, a plurality of light reflection patterns 2a are formed on an upper surface of the light guiding plate 2. The plurality of light reflection patterns 2a, as shown in FIG. 2, is in the form of V-shaped grooves.

Since the light reflection patterns 2a are formed in the form of continuous V-shaped grooves, reflection surfaces 2c and non-reflection surfaces 2b are alternately formed in the light reflection patterns 2a. Angles β between reflection surfaces 2c of the light reflection patterns 2a and an underside 2d of the light guiding plate 2 are constantly formed as 42 degrees. Since angles β are formed as being constant, angles α between the non-reflection surfaces 2b and the underside 2d are also formed as being constant.

Optical efficiency can be adjusted by adjusting directions of the light reflection patterns 2a formed on the upper surface of the light guiding plate 2 and the pixel electrode formed on the TFT substrate 5. The reason is that the moiré, which is an optical interference phenomenon, is generated depending on the directions of the light reflection patterns 2a and the pixel electrode.

The moiré phenomenon lowers the display characteristic of the liquid crystal display device 10. In order to reduce the moiré phenomenon, as shown in FIG. 3, the aligning direction of the pixel electrode 5a is offset from the direction of light reflection patterns 2a at an angle of 22.5 degrees.

Though the moiré phenomenon is prevented by forming the light reflection patterns 2a on the light guiding plate 2, the display characteristic of the light guiding plate 2 is lowered if the brightness pattern is not uniform. As described above, the brightness varies depending on the distance between the light source and the light incident portion. Thus, the brightness is increased as the light source 1 approaches the light guiding plate 2, and the brightness is lowered as the light source 1 is remote from the light guiding plate 2. This will be explained in detail with reference to FIGS. 4 and 5.

The liquid crystal display device 10 is prepared, in which the light source 1 is positioned at a side of the light guiding plate 2 formed with the light reflection pattern 2a and the liquid crystal display panel assembly 9 is assembled at a lower portion of the light guiding plate 2.

Then, the light source 1 of the liquid crystal display device 10 is turned on and the brightness variation in the effective display area of the liquid crystal display device 10 is measured. The brightness variation is measured from plural points, for example nine points as shown in FIG. 4. The measuring points should not be concentrated in a predetermined part or not be spaced too much apart from each other.

FIG. 5 shows a graph representing the measuring result of the relative brightness. Referring to the graph shown in FIG. 5, the brightness at the effective display area varies depending on the distance between the light source 1 and the measuring point. That is, the brightness decreases as the distance increases.

In detail, measuring points 1, 4 and 7 represent the high brightness distributions, and measuring points 3, 6 and 9 have relatively low brightness distributions. It means that the light is insufficiently supplied from the light source 1 as the distance increases, that is, the light is insufficiently supplied to the measuring points 3, 6 and 9 from the light source 1.

On the contrary, a relatively high amount of the light is supplied to the measuring points 1, 4 and 7, so an excessively high brightness is obtained at the measuring points 1, 4 and 7.

The liquid crystal display device 10 having a poor brightness balance does not provide a desirable display characteristics.

SUMMARY OF THE INVENTION

The present invention provides a light guiding plate capable of enhancing a brightness balance in an effective display area.

The present invention also provides a liquid crystal display device capable of performing a high quality display.

Also, the present invention provides a method for displaying pictures capable of performing a high quality display.

In one aspect, there is provided a light guiding plate comprising a light incident portion into which light is incident from a light source, a light reflecting pattern to reflect the light provided from the light incident portion, and a light transmitting surface to transmit the light reflected by the light reflecting pattern to a display panel, wherein the light reflecting pattern includes a plurality of light reflecting sections each of which has a first light reflecting plane that is inclined with respect to the light transmitting surface to face toward the light source, and a second light reflecting plane that is inclined with respect to the light transmitting surface and connected with an edge of the first light reflecting plane so that the light reflection sections each form a prism shape. The light reflecting sections respectively have the second light reflecting planes that are configured to have different areal sizes to control reflectivity of the respective light reflecting sections. The areal sizes of the second light reflecting planes are gradually increased by a selected amount such that the areal size of a second light reflecting plane is larger as the second light reflecting plane is remoter from the light incident portion. The first light reflecting planes of the light reflecting sections respectively have first angles with respect to the light transmitting surface, and the second light reflecting planes of the light reflecting sections respectively have second angles with respect to the light transmitting surface. The first angles have a substantially identical value and the second angles are gradually decreased by a selected amount such that the second angle of a second light reflecting plane is smaller as the second light reflecting plane is remoter from the light incident portion.

In another embodiment, the second angles have a substantially identical value and the first angles are gradually increased by a selected amount such that the first angle of a first light reflecting plane is larger as the first light reflecting plane is remoter from the light incident portion.

In another embodiment, areal sizes of the light reflecting sections are gradually increased by a selected amount such that the areal sizes of first and second light reflecting planes of a light reflecting section are larger as the light reflecting section is remoter from the light incident portion. In this case, the first angles have a substantially identical value, the second angles have a substantially identical value, and the heights of the light reflecting sections are gradually increased by a selected amount such that the height of a light reflecting section is larger as the light reflecting section is remoter from the light incident portion.

In another embodiment, a liquid crystal display device comprises a lamp assembly to generate light in a linear direction, a display panel assembly to display images using image data externally provided and light provided in a planar direction, and a light guiding plate comprising a light incident portion into which the light is incident from the lamp assembly, a light reflecting pattern to reflect the light provided from the light incident portion, and a light transmitting surface to transmit the light reflected by the light reflecting pattern to the display panel assembly. The light reflecting pattern includes a plurality of light reflecting sections each of which has a first light reflecting plane that is inclined with respect to the light transmitting surface to face toward the light source, and a second light reflecting plane that is inclined with respect to the light transmitting surface and connected with an edge of the first light reflecting plane so that the light reflection sections each form a prism shape. The light reflecting sections respectively have the second light reflecting planes that are configured to have different areal sizes to control reflectivity of the respective light reflecting sections.

In another embodiment, there is provided a method for displaying images in a liquid crystal display device, comprising the steps of generating light in a linear direction, transforming the light in a linear direction into light in a planar direction, in which the transforming step includes providing light reflecting sections each having a different reflectivity, and reflecting the light in a linear direction at the light reflecting sections to obtain the light in a planar direction in which a light reflecting section has higher reflectivity as the light reflecting section is remoter from a light source generating the light in a linear direction, and displaying images using the light in a planar direction and image data externally provided. The reflecting step includes varying the reflectivity of the respective light reflecting sections by changing areal sizes of the light reflecting sections such that the area size of a light reflection section is larger as the light refection section is remoter from the light source. Where the light reflecting sections each have a prism shape with first and second light reflecting planes and a bottom plane, the varying the reflectivity of the respective light reflecting sections includes maintaining a first angle between the first light reflecting plane and the bottom plane substantially constant in all the light reflecting sections, and decreasing a second angle between the second light reflecting plane and the bottom plane such that the second angle of a light reflecting section is smaller as the light reflecting section is remoter from the light source.

In another embodiment, where the light reflecting sections each have a prism shape with first and second light reflecting planes and a bottom plane, the varying the reflectivity of the respective light reflecting sections includes increasing a first angle between the first light reflecting plane and the bottom plane such that the first angle of a light reflecting section is larger as the light reflecting section is remoter from the light source, and maintaining a second angle between the second light reflecting plane and the bottom plane substantially constant in all the light reflecting sections.

In another embodiment, where the light reflecting sections each have a prism shape with first and second light reflecting planes and a bottom plane, the varying the reflectivity of the respective light reflecting sections includes maintaining angles between the first and second light reflecting planes and the bottom plane substantially constant in all the light reflecting sections, and increasing a height of the respective light reflecting sections such that the height of a light reflecting section is larger as the light reflecting section is remoter from the light source.

According to the present invention, in a dark region having an insufficient quantity of light, the liquid crystal display device displays information by using an energy charged therein. In addition, in a bright area having a sufficient quantity of light, the liquid crystal display device displays information by using an external light. When displaying information by using the energy charged therein, the brightness uniformity of the liquid crystal display device can be more improved, so that a high quality display can be achieved.

BRIEF DESCRIPTION OF THE DRAWINGS

The above and other advantages of the present invention will become more apparent by describing in detail exemplary embodiments thereof with reference to the attached drawings in which.

DETAILED DESCRIPTION OF THE INVENTION

Hereinafter, a light guiding plate and a liquid crystal display device using the same according to one embodiment of the present invention will be described in detail.

The liquid crystal display device according to the embodiment of the present invention is a "front illumination type liquid crystal display device". The front illumination type liquid crystal display device displays an image by using an external light in a place having a sufficient external light, and displays information by using an "artificial light", which is generated by consuming an electric energy, in a dark place. Therefore, the front illumination type liquid crystal display device is advantageous in view of the volume, weight and power consumption.

Figure 6:
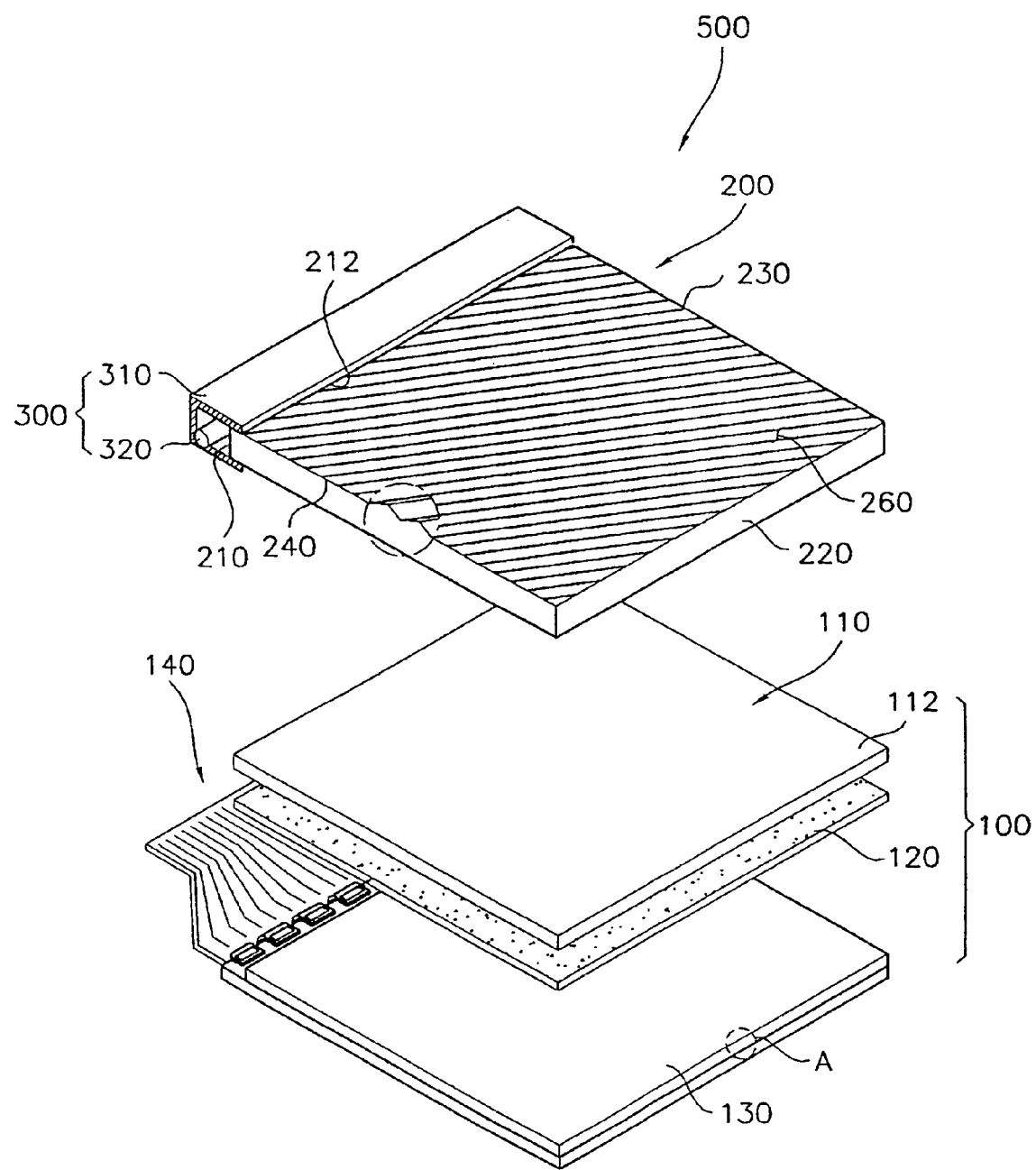
FIG. 6 is an exploded perspective view of a front illumination type liquid crystal display device according to one embodiment of the present invention.

As shown in FIG. 6, the front illumination type liquid crystal display device 500 includes a reflection type liquid crystal display panel assembly 100, light guiding plate 200, and a lamp assembly 300, which generates a light by consuming an electric energy.

The reflection type liquid crystal display panel assembly 100 is adapted for adjusting the transmissivity of the "external light" or "artificial light" so as to properly display information.

Referring to FIG. 6, the reflection type liquid crystal display panel assembly 100 includes a color filter substrate 110, a liquid crystal layer 120, a TFT substrate 130, and a driving module 140.

Figure 7:
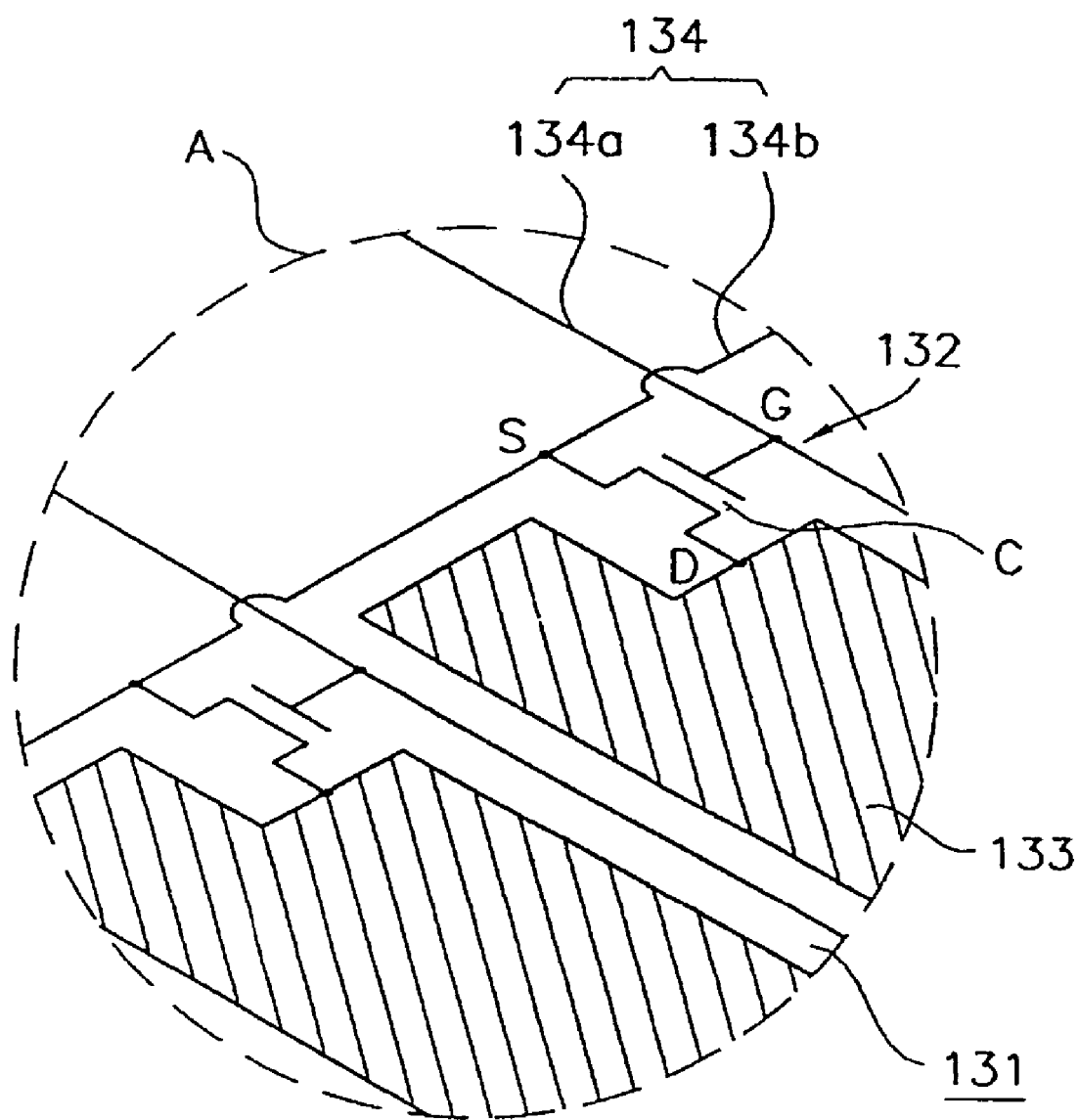
FIG. 7 is an enlarged view showing a portion of a TFT substrate shown in FIG. 6.

In detail, referring to FIG. 7, the TFT substrate 130 includes a base substrate 131, thin film transistors 132, reflection electrodes 133 and signal lines 134.

More particularly, the thin film transistors 132 are formed on an upper surface of the base substrate 131 in a matrix pattern by, for example, a semiconductor manufacturing process. The thin film transistors 132 have gate electrodes G, source electrodes S, drain electrodes D and channel layers C selectively having a conductive or a non-conductive characteristic.

The gate electrodes G and the source electrodes S of the thin film transistors 132 are connected to the signal lines 134. In detail, conductive gate lines 134a are connected to the gate electrodes G of the thin film transistors in row directions of the matrix type thin film transistors 132. In addition, conductive data lines 134b are connected to the source electrodes S of the thin film transistors in column directions of the matrix type thin film transistors 132.

On the drain electrodes D of the thin film transistors 132, the reflection electrode 133 is formed of a conductive metal having a high light reflectivity. In addition, as shown in FIGS. 6 and 7, the driving module 140 for generating a driving signal is installed at the gate lines 134a and the data lines 134b.

The power is sequentially applied to each of data lines 134b and the turn-on power is repeatedly applied to the desired gate line 134a, so that the desired power is applied to all of the reflection electrodes 133.

As shown in FIG. 6, the color filter substrate 110 is formed on an upper surface of the TFT 130 having the above structure. The color filter substrate 110 includes a transparent substrate 112, R.G.B color pixels (not shown) patterned on the transparent substrate 112, and a common electrode made of a transparent conductive material. The R.G.B. color pixels are opposite the reflection electrode 133 formed on the TFT substrate 130.

In addition, a liquid crystal layer 120 is formed between the color filter substrate 110 and the TFT substrate 130, such that the light transmissivity thereof is varied depending on the intensity of the electric field.

In order to display information, the light is supplied to the reflection type liquid crystal display panel assembly 100 and the driving signal is applied to the signal lines 134.

The light required for driving the reflection type liquid crystal display panel assembly 100 includes the above-mentioned "external light" such as sunlight, or the "artificial light" generated by consuming the electric energy which is externally supplied or stored in the liquid crystal display device.

According to the one embodiment of the present invention, as shown in FIG. 6, the lamp assembly 300 is used for displaying information in a dark place. The lamp assembly 300 includes a lamp cover 310 and a lamp 320. For example, a cold cathode ray tube type lamp is used for the lamp 320.

Though the light generated from the cold cathode ray tube type lamp 320 is suitable for a general illumination purpose, it is unsuitable for an information displaying purpose.

Since the light generated from the cold cathode ray tube type lamp 320 has a long life span and is easily produced, it is suitable for the general illumination purpose. On the contrary, the light generated from the cold cathode ray tube type lamp 320 represents an extreme brightness variation according to a distance between the light source and a light incident portion, so it is difficult to form an image having a uniform brightness. Accordingly, the light generated from the cold cathode ray tube type lamp 320 is unsuitable for the information displaying purpose.

In this embodiment, the cold cathode ray tube type lamp 320 is used together with an optical distribution varying device called "light guiding plate 200".

By using the light guiding plate 200, it is possible to display information with various advantages of the cold cathode ray tube type lamp 320, while overcoming the disadvantage of the cold cathode ray tube type lamp 320.

In detail, the light guiding plate 200 is positioned on an upper surface of the above-mentioned reflection type liquid crystal display panel assembly 100 in the front illumination type liquid crystal display device 500 so as to display information by using both external light and artificial light.

The light guiding plate 200 converts the light having an optical distribution concentrated in a small region, such as a linear light source optical distribution, into the light having a uniform optical distribution over a large region.

Hereinafter, the structure of the light guiding plate 200 used in the front illumination type liquid crystal display device 500 will be described in detail.

Figure 8:
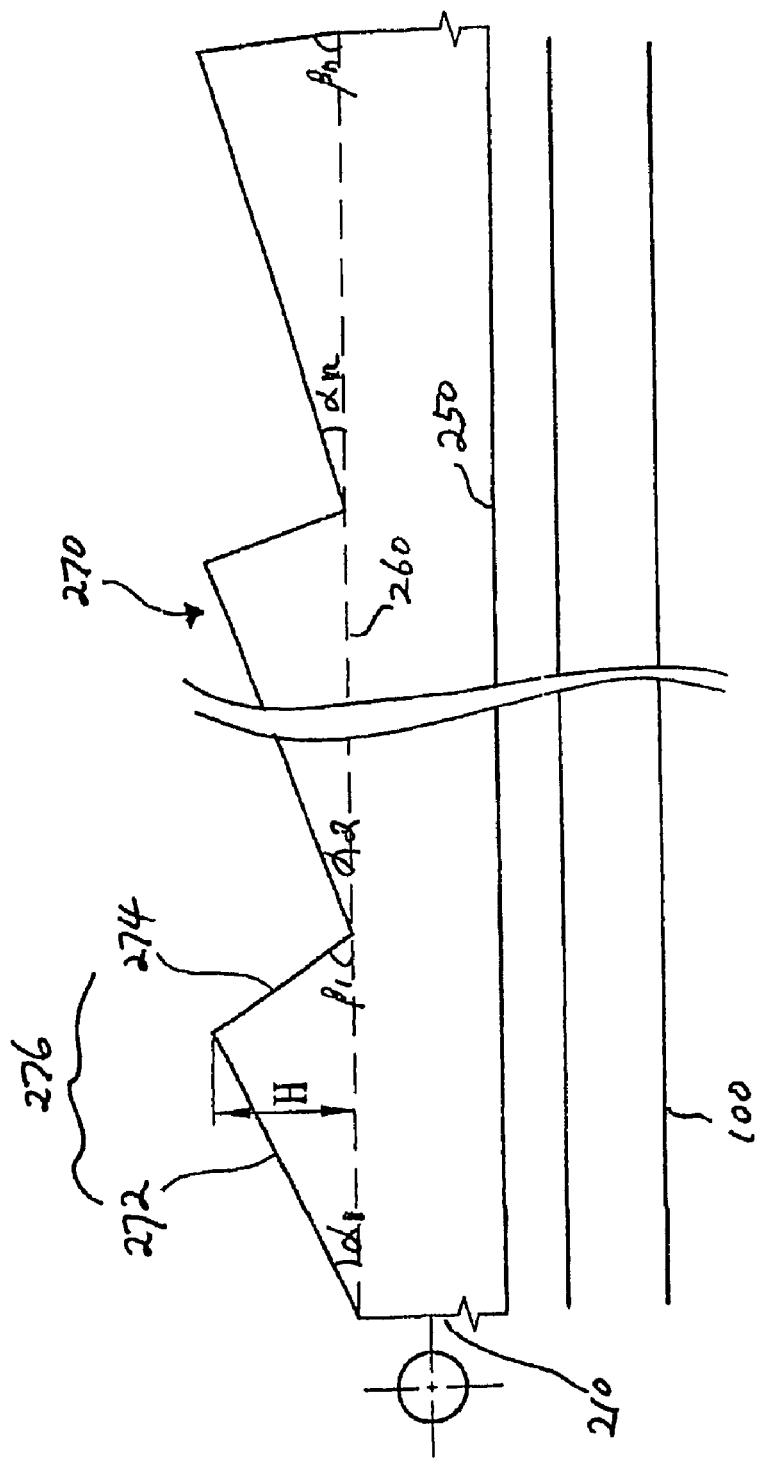
FIG. 8 is a sectional view of a light guiding plate according to one embodiment of the present invention.
Figure 9:
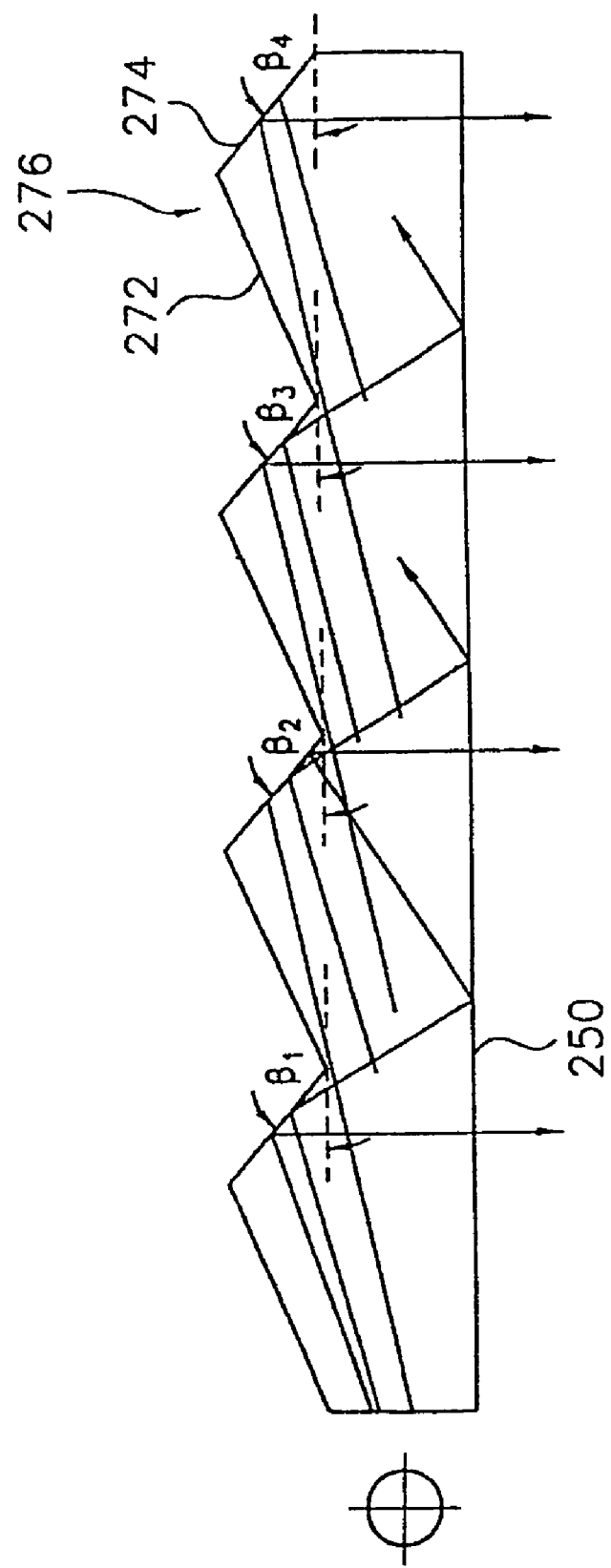
FIG. 9 is a view for explaining an optical shift in a light guiding plate according to one embodiment of the present invention.

Referring to FIG. 6 or FIG. 8, the light guiding plate 200 is in the form of a three dimensional structure having a predetermined optical refractivity to vary the optical distribution of the light.

For example, the light guiding plate 200 includes a plurality of side sections and two opposing surfaces respectively formed at upper and lower ends of the side sections.

The shape of the light guiding plate 200 corresponds to a shape of the reflection type liquid crystal display panel assembly 100. For example, the light guiding plate 200 is manufactured to have a shape identical to the shape of the reflection type liquid crystal display panel assembly 100. wherein case that the reflection type liquid crystal display panel assembly 100 is manufactured in a hexahedral shape, the light guiding plate 200 is also manufactured in the hexahedral shape.

In this embodiment, since the reflection type liquid crystal display panel assembly 100 is manufactured in a hexahedral plate shape, the light guiding plate 200 also has the hexahedral plate shape.

Therefore, the light guiding plate 200 has four side sections 210, 220, 230, and 240, a first surface 260, and a second surface 250 opposite the first surface 260.

Among four side sections 210, 220, 230, and 240 of the light guiding plate 200, one side section directly faces the lamp assembly 300. The side section facing the lamp assembly 300 to receive the light having a densely distributed optical distribution is defined as a "light incident side section", which is represented by "210".

The light supplied to the light guiding plate 200 through the light incident side section 210 reaches the first surface 260 adjacent to the light incident side section 210 through various paths. Two paths are explained herein in detail.

A first path is formed where the light passing through the light incident side section 210 directly reaches the first surface 260 without any reflections. A second path is formed where the light passing through the light incident side section 210 indirectly reaches the first surface 260 by being reflected by the second surface 250 at least one time.

In both cases, the light reaching the first surface 260 is reflected towards the reflection type liquid crystal display panel assembly 100. While the light is being reflected by the first surface 260, the optical distribution of the light is varied from a dense distribution concentrated on a limited area to an expanded distribution over an enlarged area.

In order to effectively reflect the light by the first surface 260, the "light reflection pattern 270" is formed on the first surface 260, as shown in the embodiment of FIG. 8. The light reflection pattern 270 allows the light guiding plate 200 to provide the liquid crystal display panel assembly 100 with light having uniform brightness distribution.

Referring to FIGS. 6-9, the light reflection pattern 270 preferably has "a plurality of light reflection sections 276 which are, for example, each protruded from the first surface 260 in the form of a prism column. The light reflection sections 276 are, for example, continuously arranged parallel with each other on the first surface 260. The light reflection sections 276 may be tilted in a selected angle (e.g., 22.5 degree) with respect to a boundary line 212 formed between the light incident side section 210 and the first surface 260, in order to prevent the moiré phenomenon One embodiment of the light reflection sections 276 forming the light reflection pattern 270 is illustrated in FIG. 8. Referring to FIG. 8, the unit light reflection sections 276 are formed by being protruded from the first surface 260 in the form of prism columns continuously arranged, so that a V-shaped elongated groove is formed between the adjacent light reflection sections 276.

In this embodiment, since the light reflection section 276 has a prism shape, each of the light reflection sections 276 includes two inclined planes 272 and 274.

The light inputted through the above-mentioned light incident side section 210 reaches the first and second inclined planes 272 and 274 via different light travel paths. While the incident light arrives on the most of the first inclined planes 272 through one or more reflections, it arrives on the second inclined planes 274 through less reflection or without any reflection.

Assuming that the light reflection sections 276 are identical to each other, the inclined planes closer to the light incident section 210 reflect more amount of light than that by the inclined planes remoter from the light incident section, so that an area closer to the light incident section 210 is brighter that an area remoter from the light incident section 210. As a result, a bright region is formed at an area closer to the light incident section 210, and a dark region is formed at an area remoter from the light incident section 210. In the present invention, the light guiding plate prevents the light reflection sections from reflecting light in such a non-uniform manner by employing the inclined planes having different shapes in accordance with the distance from the light incident section 210.

In the embodiment of FIG. 8, the brightness variation can occur in the effective display area of the front illumination type liquid crystal display device 500 depending on the angle of the second inclined plane 274 with respect to the first surface 260 which is substantially parallel with the second surface 250.

In order to decrease the brightness variation, the angle between the second inclined plane 274 and the first surface 260 is adjusted. That is, the angle is adjusted such that the light is shifted from a place having sufficient quantity of light to a place having insufficient quantity of light in the effective display area, so the brightness variation and the moiré phenomenon are simultaneously prevented.

The light shift from the place having sufficient quantity of light to the place having insufficient quantity of light is determined depending on whether the light supplied through the light incident side section 210 and reflected by the light reflection sections 276 is transmitted through the second surface 250 or reflected again by the second surface 250.

In detail, in order to adjust the optical balance through the light shift in the place having insufficient quantity of the light, the amount of light reflected by the light reflection section 276 is increased by increasing the areal size of the first inclined plane 272 at the place having insufficient quantity of the light.

In the embodiment of FIG. 8, the areal size of the first inclined plane 272 is varied in the respective light reflection sections 276 by having the angle of the second inclined plane with respect to the first surface 260 different. In other words, the inclined angles ($\beta_1$-$\beta_n$) between the second inclined planes 274 and the first surface 260 are gradually increased by a selected amount as the light reflection section 276 is positioned remoter from the cold cathode ray tube type lamp 320. In like manner, the inclined angles ($\beta_1$-$\beta_n$) between the second inclined planes 274 and the first surface 260 are gradually decreased by a selected amount as the light reflection section 276 is positioned closer to the cold cathode ray tube type lamp 320. The second surface 250 transmits more amount of light as the first inclined plane 272 has a larger areal size because the first inclined plane 272 with a larger areal size reflects more amount of light. In this embodiment, ($\alpha_1$-$\alpha_n$) of the light reflection sections 276 are varied in accordance with positions of the light reflection sections 276 relative to the cathode ray tube Also, the light reflection sections 276 have a substantially identical height which is a distance between the first surface 260 and a common edge at which the first and second inclined planes 272 and 274 are met each other.

It is difficult to pass the light reflected by the second inclined plane 274 through the second surface 250 as the angle between the second inclined plane 274 and the first surface 260 becomes smaller. On the contrary, the light reflected from the second inclined plane 274 easily passes through the second surface 250 as the angle between the second inclined plane 274 and the first surface 250 becomes larger.

For example, the light reflection section closest to the cold cathode ray tube type lamp 320 has angle $\beta_1$ in the range of about 35±3 degrees. In contrast, the light reflection section remotest from the cold cathode ray tube type lamp 320 has angle $\beta_n$ in the range of about 42±4 degrees.

Figure 10:
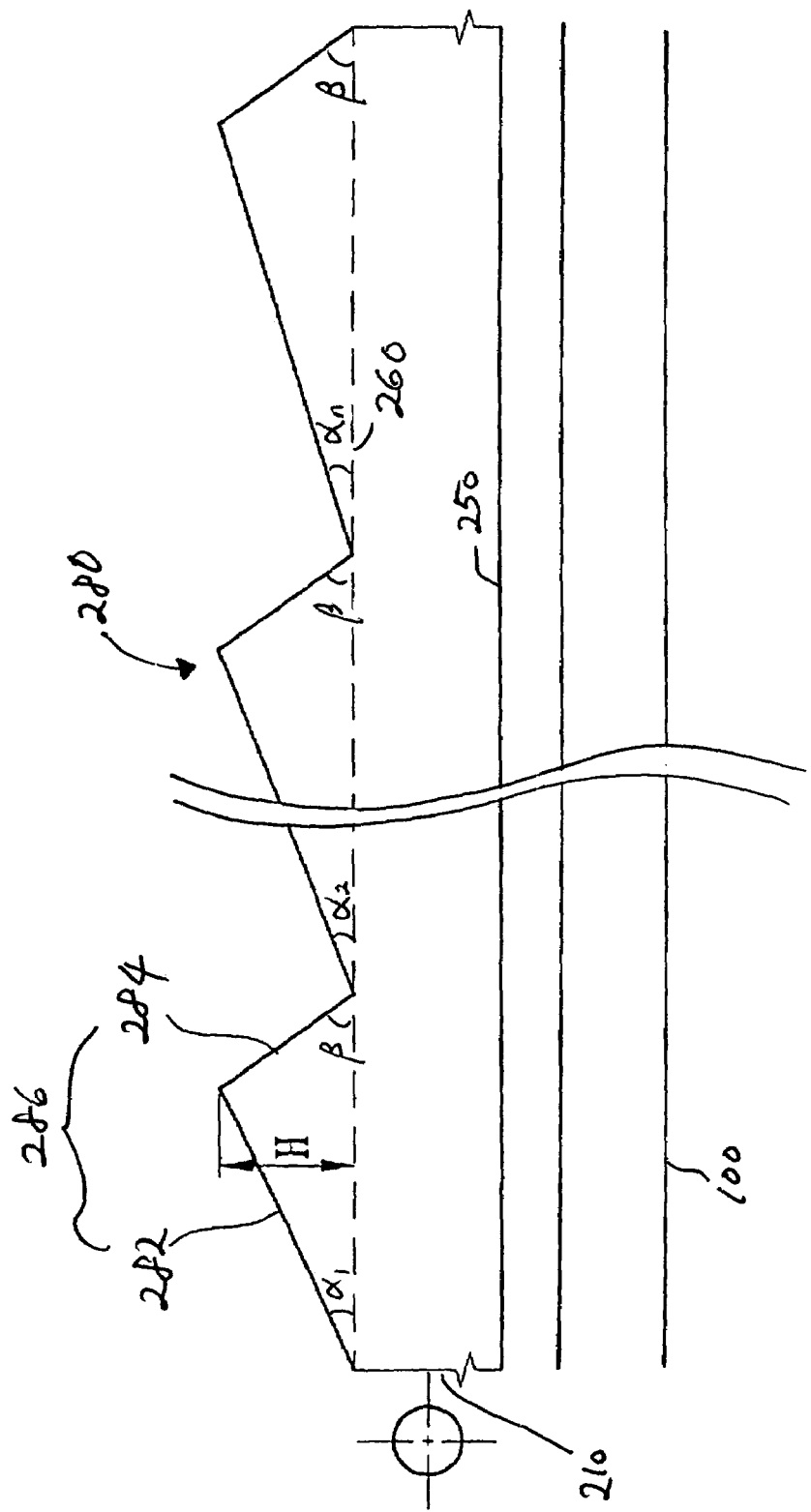
FIG. 10 is a sectional view of a light guiding plate according to another embodiment of the present invention.

FIG. 10 is a sectional view of a light guiding plate according to another embodiment of the present invention. In FIG. 10, the same parts as those shown in FIG. 8 are represented with like reference numerals, and their explanation will be omitted to avoid description duplication. The light guiding plate includes a light reflection pattern 280 formed on the first surface 260 of the light guiding plate. The light reflection pattern 280 has multiple light reflection sections 286 each of which is protruded from the first surface in the form of a prism column. Each light reflection section 286 has first and second inclined planes 282 and 284 to reflect the light provided through the light incident side section 210 and a height H which is a distance between the first surface 260 and a common edge at which the first and second inclined planes 282 and 284 are met each other. The first inclined plane 282 is inclined to have a first angle ($\alpha$) with respect to the first surface 260, and the second inclined plane 284 is inclined to have a second angle ($\beta$) with respect to the first surface 260.

In this embodiment, the first angles ($\alpha_1$-$\alpha_n$) of the light reflection sections 286 are varied in accordance with positions of the light reflection sections, and the second angles ($\beta$) of the light reflection sections have a substantially identical value. Also, the light reflection sections 286 have a substantially identical height. The first angles ($\alpha_1$-$\alpha_n$) have different values such that the first angle of a light reflection section is smaller as the light reflection section is remoter from the light incident side section 210. In other words, the first angles ($\alpha_1$-$\alpha_n$) are gradually decreased by a selected amount from the light reflection section 286 closest to the light incident side section 210 to the light reflection section 286 remotest from the light incident side section 210.

As a result, the areal sizes of the first inclined planes 282 are gradually increased such that the areal size of a first inclined plane is larger as the first inclined plane is remoter from the light incident side section 210. Accordingly, the remoter the light reflection section is from the light incident side section 210, the higher is the reflectivity of the light reflection section. This is because the light reflection section remoter from the light incident side section 210 has the first inclined plane with a larger areal size. By employing the light reflection pattern 280, the light guiding plate provides the display panel assembly 100 with the light having uniform brightness distribution.

Figure 11:
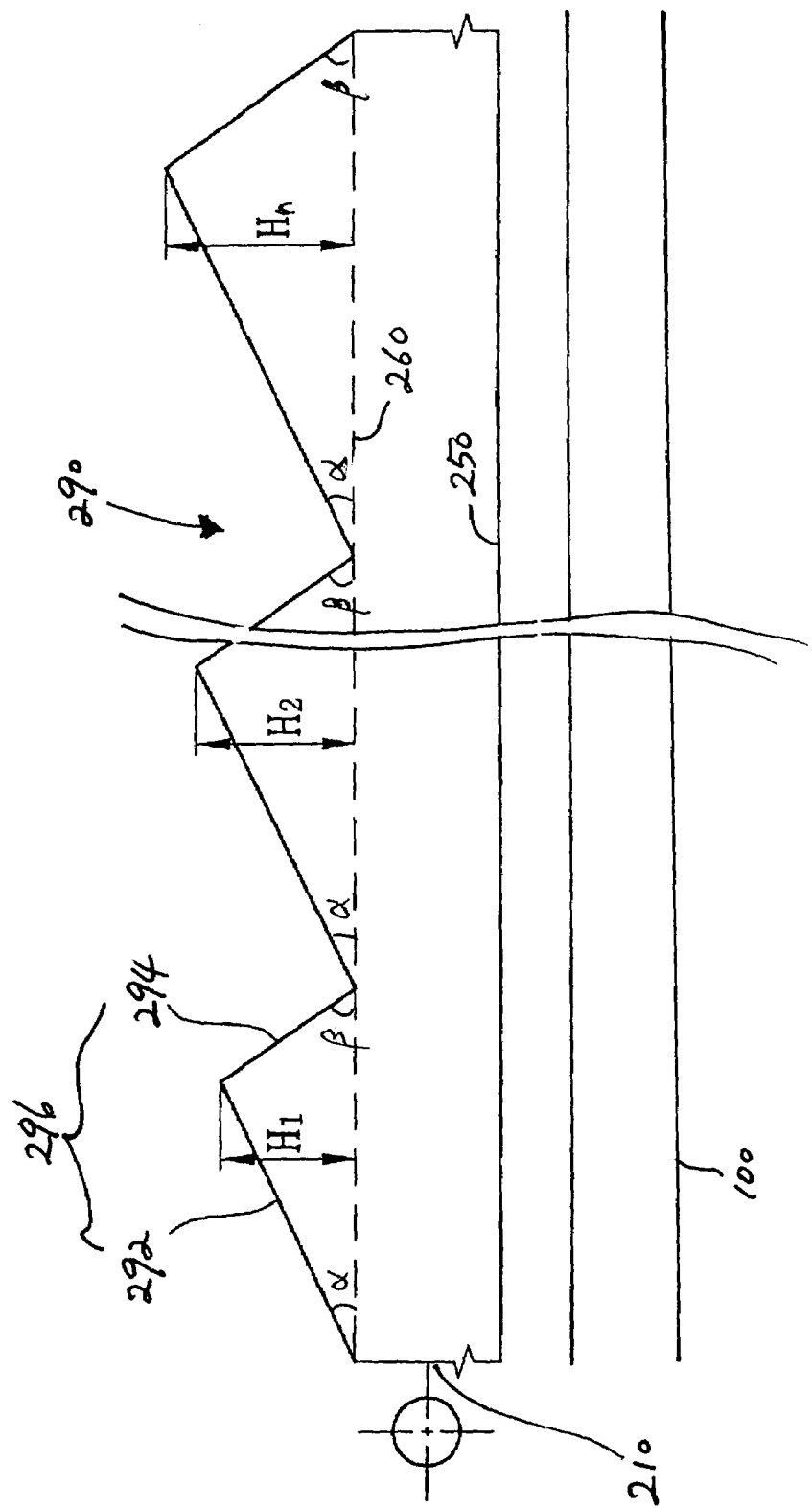
FIG. 11 is a sectional view of a light guiding plate according to another embodiment of the present invention.

FIG. 11 is a sectional view of a light guiding plate according to another embodiment of the present invention. In FIG. 11, the same parts as those shown in FIGS. 8 and 10 are represented with like reference numerals, and their explanation will be omitted to avoid description duplication. The light guiding plate includes a light reflection pattern 290 formed on the first surface 260 of the light guiding plate. The light reflection pattern 290 has multiple light reflection sections 296 each of which is protruded from the first surface in the form of a prism column. Each light reflection section 296 has first and second inclined planes 292 and 294 to reflect the light provided through the light incident side section 210 and a height which is a distance between the first surface 260 and a common edge at which the first and second inclined planes 292 and 294 are met each other. The first inclined plane 292 is inclined to have a first angle $\alpha$ with respect to the first surface 260, and the second inclined plane 294 is inclined to have a second angle $\beta$ with respect to the first surface 260.

In this embodiment, the first angles a of the light reflection sections 296 have a substantially identical value, and the second angles $\beta$ of the light reflection sections 296 also have a substantially identical value. The light reflection sections 296 each have a different height such that the height of a light reflection section is larger as the light reflection section is remoter from the light incident side section 210. In other words, the heights ($H_1$-$H_n$) of the light reflection sections 296 are gradually increased by a selected amount from the light reflection section closest to the light incident side section 210 to the light reflection section remotest from the light incident side section 210.

As a result, the areal sizes of the first inclined planes 292 are gradually increased such that the areal size of a first inclined plane is larger as the first inclined plane is remoter from the light incident side section 210. Also, the areal sizes of the second inclined planes 294 are gradually increased such that the areal size of a second inclined plane is larger as the second inclined plane is remoter from the light incident side section 210. Accordingly, the remoter the light reflection section is from the light incident side section 210, the higher is the reflectivity of the light reflection section. This is because the light reflection section remoter from the light incident side section 210 has the first and second inclined planes with larger areal sizes, respectively. By employing the light reflection pattern 290, the light guiding plate provides the display panel assembly 100 with the light having uniform brightness distribution.

Figure 12:
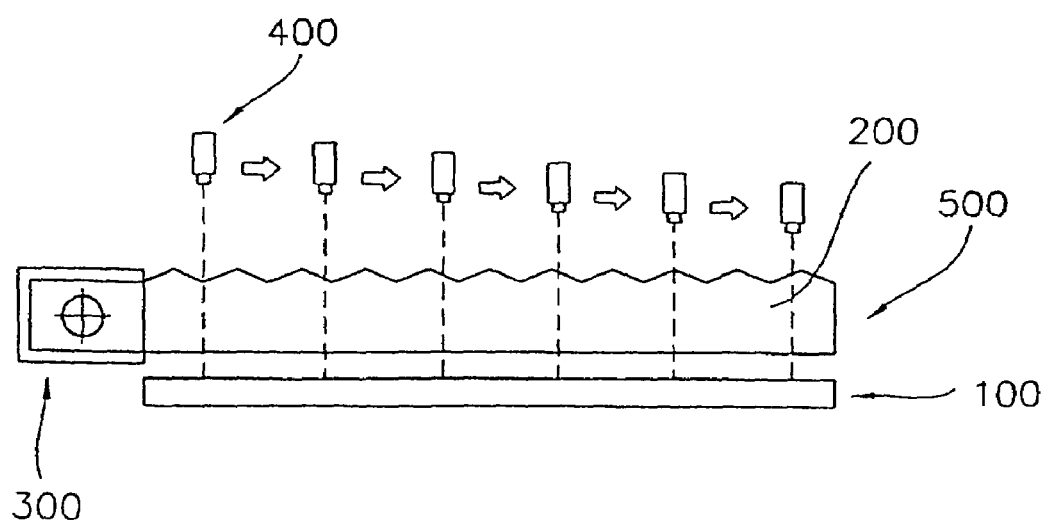
FIG. 12 is a view showing a method for measuring the brightness in a liquid crystal display device according to one embodiment of the present invention.
Figure 13:
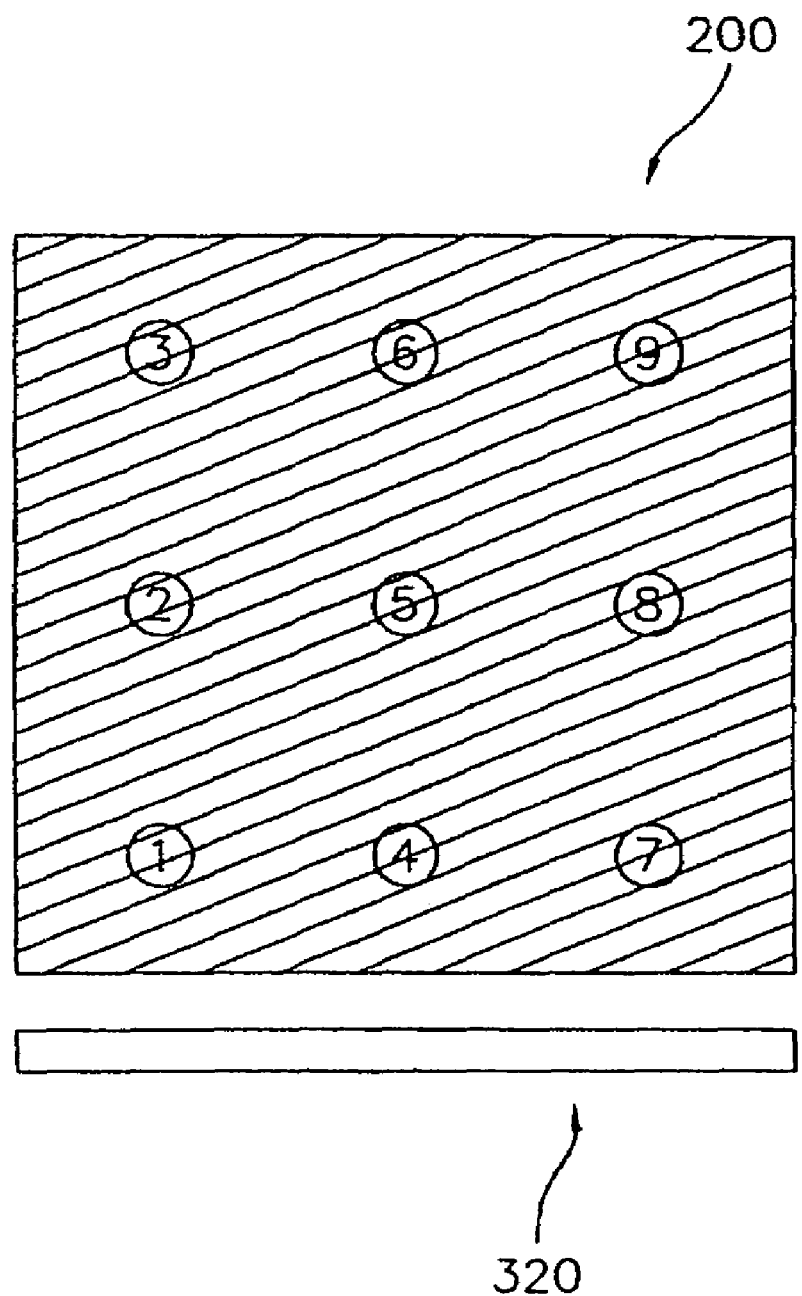
FIG. 13 is a plan view showing brightness measuring points in a liquid crystal display device according to one embodiment of the present invention.
Figure 14:
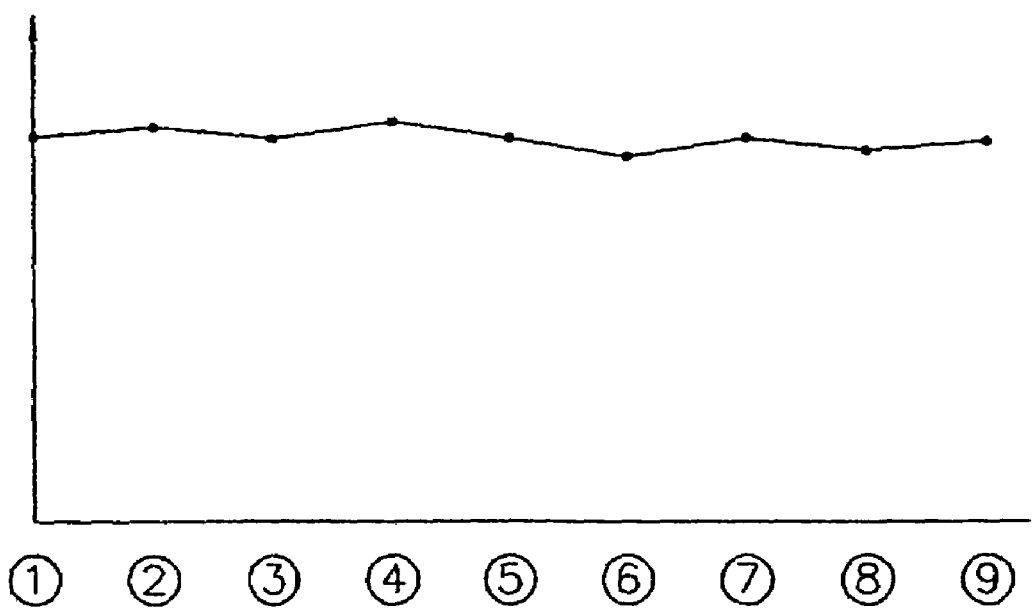
FIG. 14 is a graph showing the brightness measured in a liquid crystal display device according to one embodiment of the present invention.

In order to verify the effect of the inclined angle of the light reflect plane on the brightness, as shown in FIGS. 12 to 14, brightness is measured at a front side of the display panel by using a detector 400. To this end, the light guiding plate 200 is assembled with the liquid crystal display panel assembly 100, in which the light reflection sections of the light guiding plate are formed in accordance with one of the embodiments in FIGS. 8, 10 and 11.

Referring to FIGS. 12 and 13, the detector 400 measures the brightness at nine measuring points at the effective display area of the liquid crystal display panel assembly 100.

Figure 1:
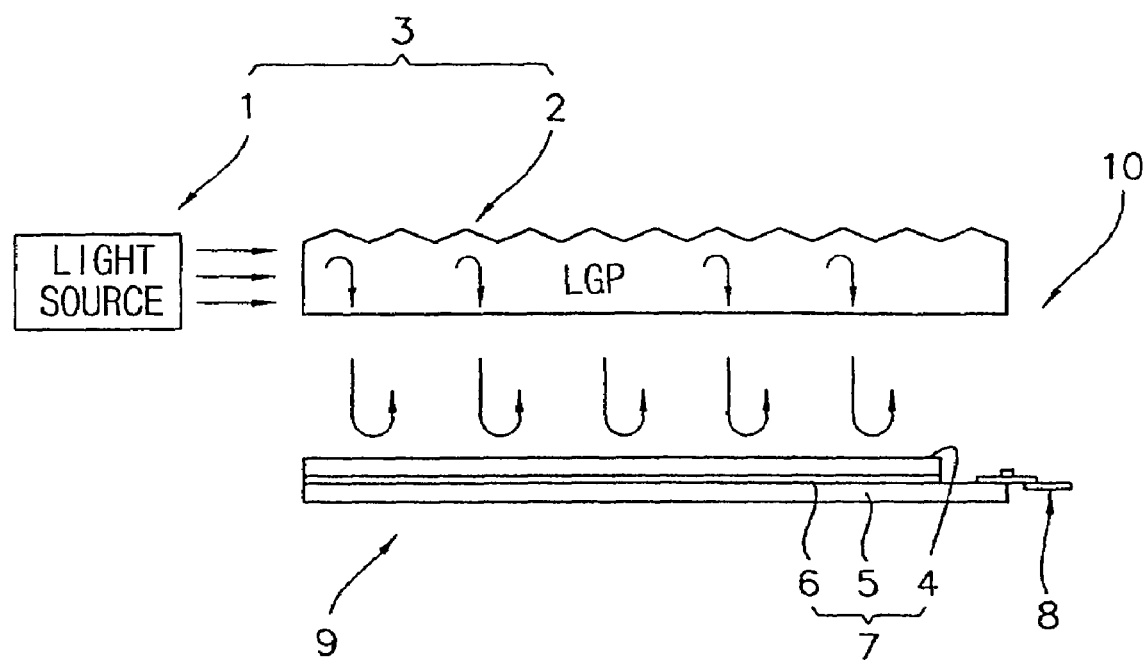
FIG. 1 is a schematic view of a conventional liquid crystal display device.
Figure 2:
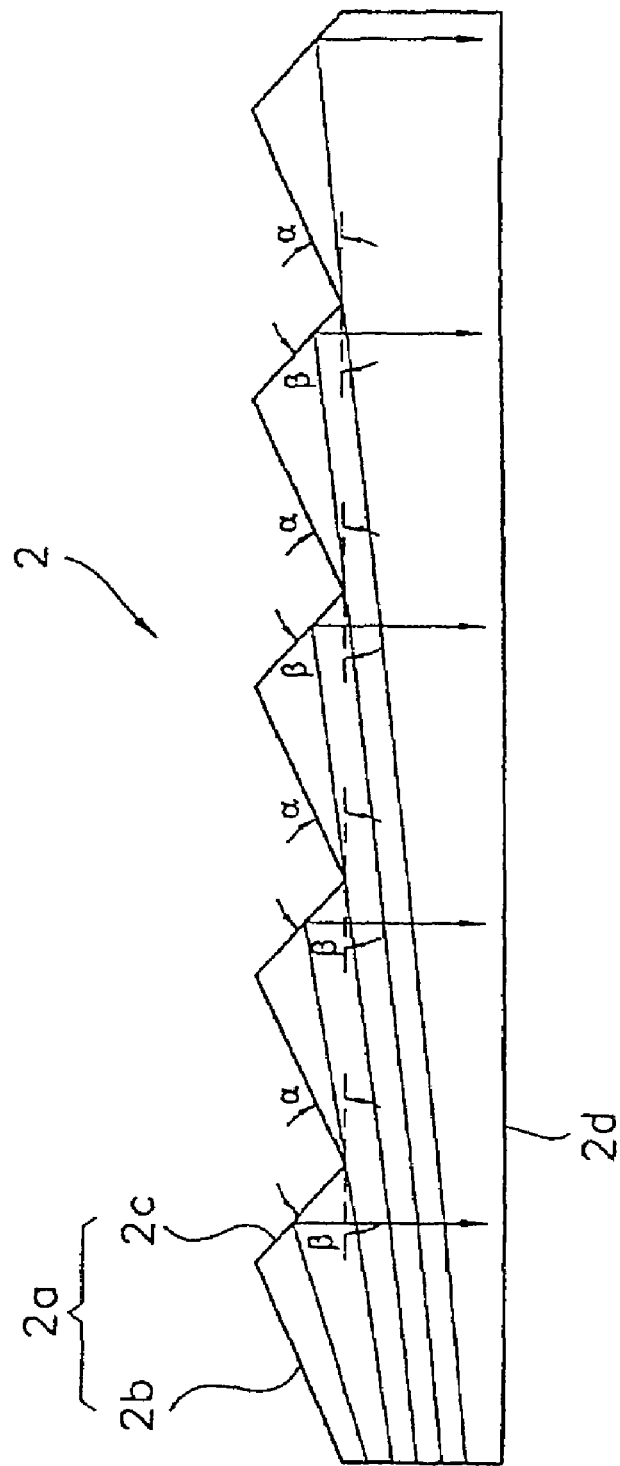
FIG. 2 is a sectional view showing a light reflection pattern formed on an upper surface of the conventional liquid crystal display device.
Figure 3:
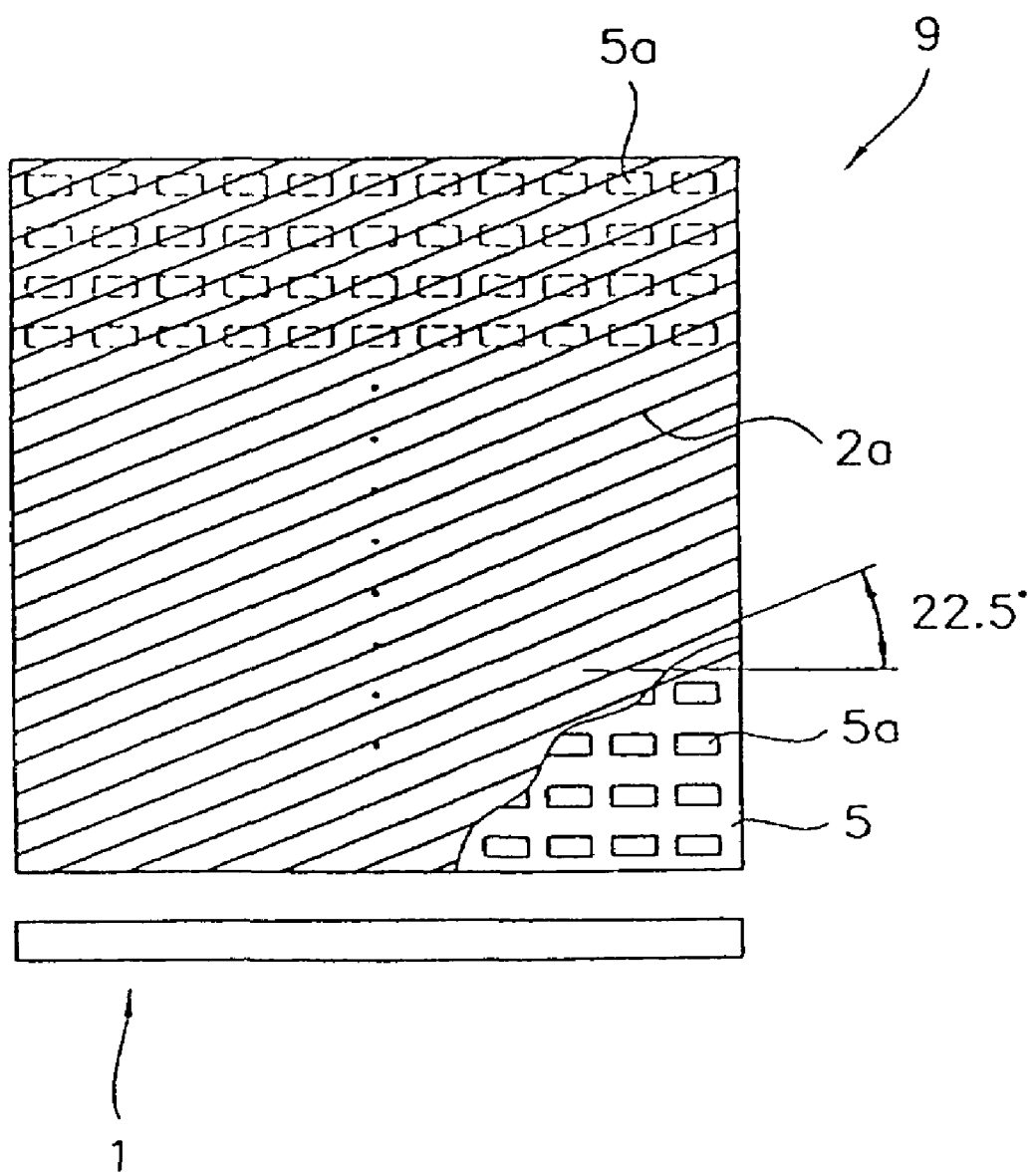
FIG. 3 is a schematic view showing a pixel electrode tilted with respect to a light reflection pattern of the conventional liquid crystal display device.
Figure 4:
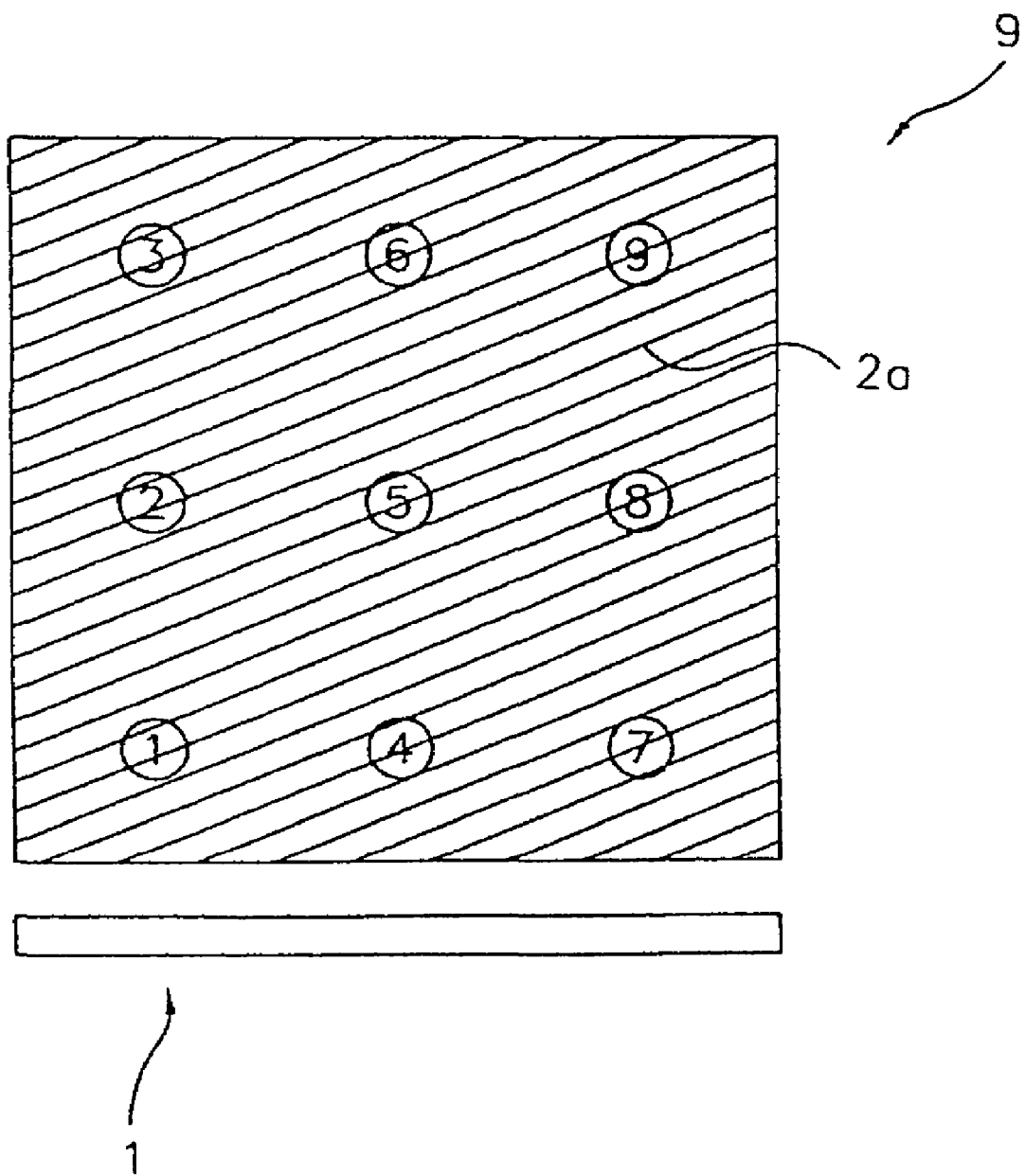
FIG. 4 is a schematic view showing a method for measuring a brightness at plural points of an effective display area of the conventional liquid crystal display device as shown in FIG. 3.
Figure 5:
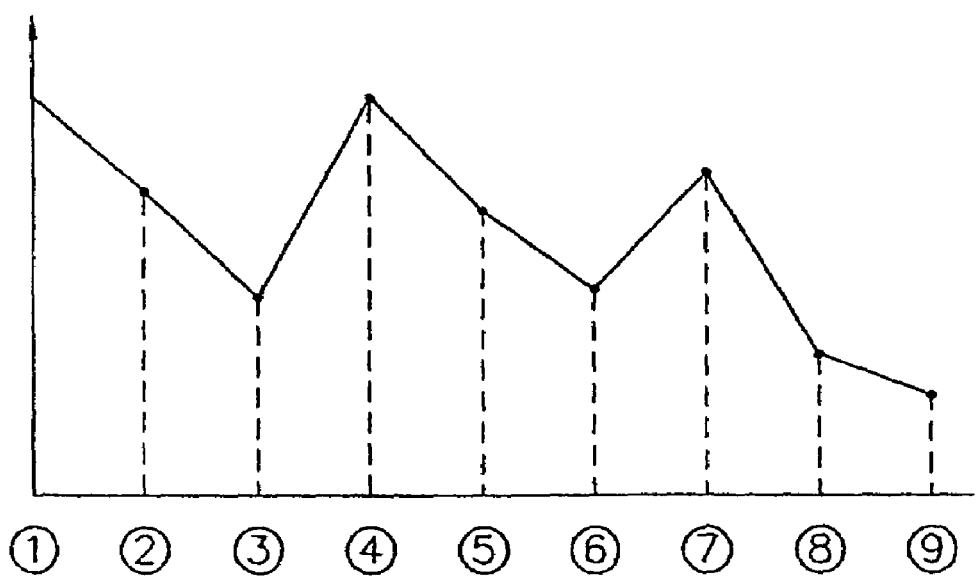
FIG. 5 is a graph showing the brightness at each measuring point of FIG. 4.

FIG. 13 shows a graph representing the measuring result of the relative brightness obtained from nine measuring points. Referring to FIG. 13, the measuring result represents that the brightness variation over the entire effective display area is reduced as compared with the conventional brightness variation shown in FIGS. 4 and 5.

Conventionally, the brightness increases at a position which is close to the cold cathode ray tube type lamp 320 and is lowered as at a position which is remote from the cold cathode ray tube type lamp 320. However, referring to FIGS. 13 and 14, the brightness is uniform regardless of the distance with respect to the cold cathode ray tube type lamp 320.

Figure 15:
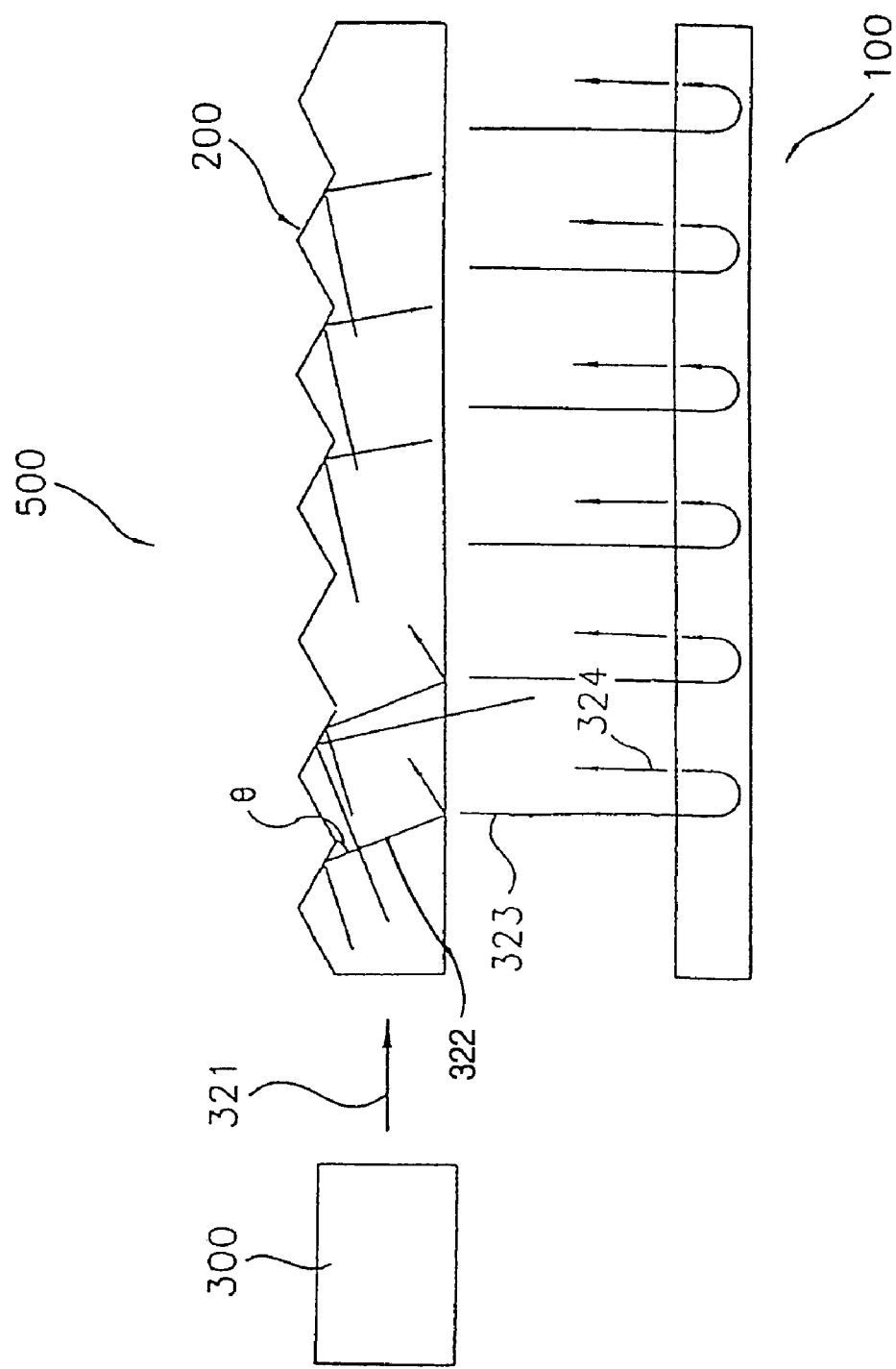
FIG. 15 is a view showing a method for displaying pictures in a liquid crystal display device according to one embodiment of the present invention.

FIG. 15 shows a method for displaying an image in the liquid crystal display device.

The lamp assembly 300 generates a first light 321 having a first optical distribution. The first light 321 having the first optical distribution is a linear light source, so it has a non-uniform brightness distribution.

The first light 321 is incident into the light guiding plate 200. The first light 321 is reflected by the light reflection sections. The light guiding plate 200 of the liquid crystal display device may be implemented with one of the above embodiments in FIGS. 8, 10 and 11. The light reflection pattern of the light guiding plate 200 may have the same shape as one of the above embodiments or a shape combining those of the above embodiments.

In case that the embodiment of FIG. 8 is employed in the liquid crystal display device, the reflection angle θ continuously varies according to the position of a light reflection section. The first light 321 is converted into a second light 322 having a second optical distribution, which is more uniform than the first optical distribution, and is reflected towards the liquid crystal display panel assembly 100. The varied reflection angle θ of a vertically reflected second light gradually increases as a distance between a position at which the first light is incident and a position at which the first light is generated increases. The vertically reflected second light is a second light that is incident vertically onto a surface of a LCD panel.

The reflectivity and the transmissivity of the second light 322 reflected towards the liquid crystal display panel assembly 100 are varied depending on the reflection angle thereof.

The second light 322 has a higher reflectivity at a position that is close to the lamp assembly 300, but the transmissivity thereof is reduced. On the contrary, the second light 322 has a lower reflectivity and a higher transmissivity at a position that is remote from the lamp assembly 300.

Therefore, a portion of the second light 322 reflected by an upper surface of the light guiding plate at a position adjacent to the lamp assembly 300 is reflected again towards the upper surface of the light guiding plate 200. Then, the second light 322 reflected by the upper surface of the light guiding plate 200 is subject to a light shift process by being repeatedly reflected towards the liquid crystal display panel assembly 100 at least one time. Then, the second light 322 is outputted from the light guiding plate 200. Hereinafter, the light outputted from the light guiding plate 200 is referred to as a third light 323.

The third light 323 is incident into the liquid crystal display panel assembly 100. Then, the third light 323 is subject to an optical modulation process in the liquid crystal display panel assembly 100 so that a fourth light 324 including images are created. After that, the fourth light 324 passes through the light guiding plate 200 and is incident into eyes of a user.

As described above, in a dark place having insufficient quantity of light, the liquid crystal display device of the present invention displays information by consuming an electric energy stored therein or supplied from an outside. In a place having sufficient quantity of light, the liquid crystal display device of the present invention displays information by using the external light. When displaying information by using the electric energy, the brightness uniformity is more improved so that the high quality display is achieved.

While the present invention has been described in detail with reference to the exemplary embodiments thereof, it should be understood to those skilled in the art that various changes, substitutions and alterations can be made hereto without departing from the scope of the invention as defined by the appended claims.

What is claimed is:

1. A light guiding plate comprising:
   a light incident portion into which light is incident from a light source;
   a light reflecting pattern to reflect the light provided from the light incident portion; and
   a light transmitting surface to transmit the light reflected by the light reflecting pattern to a display panel,
   wherein the light reflecting pattern includes a plurality of light reflecting sections each of which has:
      a first light reflecting plane that is inclined with respect to the light transmitting surface to face toward the light source; and
      a second light reflecting plane that is inclined with respect to the light transmitting surface and connected with an edge of the first light reflecting plane so that the light reflection sections each form a prism shape, the light reflecting sections respectively having the second light reflecting planes that are configured to have different areal sizes to control reflectivity of the respective light reflecting sections,
   wherein the areal sizes of the second light reflecting planes are gradually increased by a selected amount such that the areal size of a second light reflecting plane is larger as the second light reflecting plane is remoter from the light incident portion, and
   wherein the first light reflecting planes of the light reflecting sections respectively have first angles with respect to the light transmitting surface, and the second light reflecting planes of the light reflecting sections respectively have second angles with respect to the light transmitting surface, the first angles having a substantially identical value and the second angles being gradually decreased by a selected amount such that the second angle of a second light reflecting plane is smaller as the second light reflecting plane is remoter from the light incident portion.

2. The light guiding plate of claim 1, wherein the light reflecting sections each have a substantially identical height.

3. A light guiding plate comprising:
   a light incident portion into which light is incident from a light source;
   a light reflecting portion comprising a light reflecting pattern to reflect the light provided from the light incident portion; and
   a light transmitting surface to transmit the light reflected by the light reflecting pattern to a display panel,
   wherein the light reflecting pattern includes a plurality of light reflecting protrusions, each of the light reflecting protrusions comprising:
      a first light reflecting plane that is inclined with respect to the light transmitting surface to face toward the light source; and
      a second light reflecting plane that is inclined with respect to the light transmitting surface and connected with a first edge of the first light reflecting plane and a second edge of an adjacent first light reflecting plane so that the light reflecting protrusions each form a prism shape, the light reflecting protrusions respectively having the second light reflecting planes that are configured to have different areal sizes to control reflectivity of the respective light reflecting protrusions,
   wherein areal sizes of the light reflecting protrusions are gradually increased by a selected amount such that the areal sizes of the first light reflecting plane and the areal size of the second light reflecting plane are larger as the light reflecting protrusion is remoter from the light incident portion, and
   wherein the first light reflecting planes of the light reflecting protrusions respectively have first angles with respect to the light transmitting surface, the second light reflecting planes of the light reflecting protrusions respectively have second angles with respect to the light transmitting surface, and the light reflecting protrusions each have different heights, wherein the first angles have a substantially identical value, the second angles have a substantially identical value, and the heights from the light transmitting surface to a tip of the light reflecting protrusions are gradually increased by a selected amount such that the height of a light reflecting protrusion is larger as the light reflecting protrusion is remoter from the light incident portion.

4. A liquid crystal display device comprising:
a lamp assembly to generate light in a linear direction;
a display panel assembly to display images using image data externally provided and light provided in a planar direction; and
a light guiding plate comprising:
a light incident portion into which the light is incident from the lamp assembly;
a light reflecting pattern to reflect the light provided from the light incident portion; and
a light transmitting surface to transmit the light reflected by the light reflecting pattern to the display panel assembly,
wherein the light reflecting pattern includes a plurality, of light reflecting sections each of which has:
a first light reflecting plane that is inclined with respect to the light transmitting surface to face toward the light source; and
a second light reflecting plane that is inclined with respect to the light transmitting surface and connected with an edge of the first light reflecting plane so that the light reflection sections each form a prism shape, the light reflecting sections respectively having the second light reflecting planes that are configured to have different areal sizes to control reflectivity of the respective light reflecting sections,
wherein the areal sizes of the second light reflecting planes are gradually increased by a selected amount such that the areal size of a second light reflecting plane is larger as the second light reflecting plane is remoter from the light incident portion, and
wherein the first light reflecting planes of the light reflecting sections respectively have first angles with respect to the light transmitting surface, and the second light reflecting planes of the light reflecting sections respectively have second angles with respect to the light transmitting surface, the first angles having a substantially identical value and the second angles being gradually decreased by a selected amount such that the second angle of a second light reflecting plane is smaller as the second light reflecting plane is remoter from the light incident portion.

5. The liquid crystal display device of claim 4, wherein the light reflecting sections each have a substantially identical height.

6. A liquid crystal display device comprising:
a lamp assembly to generate light in a linear direction;
a display panel assembly to display images using image data externally provided and light provided in a planar direction; and
a light guiding plate comprising:
a light incident portion into which the light is incident from the lamp assembly;
a light reflecting portion comprising a light reflecting pattern to reflect the light provided from the light incident portion; and
a light transmitting surface to transmit the light reflected by the light reflecting pattern to the display panel assembly,
wherein the light reflecting pattern includes a plurality of light reflecting protrusions, each of the light reflecting protrusions comprising:
a first light reflecting plane that is inclined with respect to the light transmitting surface to face toward the light source; and
a second light reflecting plane that is inclined with respect to the light transmitting surface and connected with a first edge of the first light reflecting plane and a second edge of an adjacent first light reflecting plane so that the light reflecting protrusions each form a prism shape, the light reflecting protrusions respectively having the second light reflecting planes that are configured to have different areal sizes to control reflectivity of the respective light reflecting protrusions,
wherein areal sizes of the light reflecting protrusions are gradually increased by a selected amount such that the areal sizes of the first light reflecting plane and the areal size of the second light reflecting plane are larger as the light reflecting protrusion is remoter from the light incident portion, and
wherein the first light reflecting planes of the light reflecting protrusions respectively have first angles with respect to the light transmitting surface, the second light reflecting planes of the light reflecting protrusions respectively have second angles with respect to the light transmitting surface, and the light reflecting protrusions each have different heights, wherein the first angles have a substantially identical value, the second angles have a substantially identical value, and the heights from the light transmitting surface to a tip of the light reflecting protrusions are gradually increased by a selected amount such that the height of a light reflecting protrusion is larger as the light reflecting protrusion is remoter from the light incident portion.

7. A method for displaying images in a liquid crystal display device, comprising:
generating light in a linear direction;
transforming the light in a linear direction into light in a planar direction, the transforming step including:
providing light reflecting sections each having a different reflectivity; and
reflecting the light in a linear direction at the light reflecting sections to obtain the light in a planar direction, a light reflecting section having higher reflectivity as the light reflecting section is remoter from a light source generating the light in a linear direction; and
displaying images using the light in a planar direction and image data externally provided;
wherein the reflecting step includes varying the reflectivity of the respective light reflecting sections by changing areal sizes of the light reflecting sections such that the area size of a light reflection section is larger as the light refection section is remoter from the light source; and
wherein the light reflecting sections each have a prism shape with first and second light reflecting planes and a bottom plane, the varying the reflectivity of the respective light reflecting sections including:
maintaining a first angle between the first light reflecting plane and the bottom plane substantially constant in all the light reflecting sections; and
decreasing a second angle between the second light reflecting plane and the bottom plane such that the second angle of a light reflecting section is smaller as the light reflecting section is remoter from the light source.

8. A method for displaying images in a liquid crystal display device, comprising:
  generating light in a linear direction;
  transforming the light in a linear direction into light in a planar direction, the transforming step including:
    providing light reflecting sections each having a different reflectivity; and
    reflecting the light in a linear direction at the light reflecting sections to obtain the light in a planar direction, a light reflecting section having higher reflectivity as the light reflecting section is remoter from a light source generating the light in a linear direction; and p1 displaying images using the light in a planar direction and image data externally provided;
  wherein the reflecting step includes varying the reflectivity of the respective light reflecting sections by changing areal sizes of the light reflecting sections such that the area size of a light reflection section is larger as the light reflection section is remoter from the light source wherein the light reflecting sections each have a prism shape with first and second light reflecting planes and a bottom plane, the first light reflecting plane being connected with an adjacent second light reflecting plane and the second light reflecting plane being connected with an adjacent first light reflecting plane, the varying the reflectivity of the respective light reflecting sections including:
maintaining angles between the first and second light reflecting planes and the bottom plane substantially constant in all the light reflecting sections; and
increasing a height of the respective light reflecting sections such that the height of a light reflecting section is larger as the light reflecting section is remoter from the light source.

* * * * *